(12) United States Patent
Kado

(10) Patent No.: US 7,649,870 B2
(45) Date of Patent: Jan. 19, 2010

(54) MULTI-HOP MULTI-CHANNEL WIRELESS COMMUNICATION SYSTEM

(75) Inventor: Youiti Kado, Kyoto (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 712 days.

(21) Appl. No.: 11/287,444

(22) Filed: Nov. 28, 2005

(65) Prior Publication Data

US 2006/0114869 A1 Jun. 1, 2006

(30) Foreign Application Priority Data

Nov. 30, 2004 (JP) ............................. 2004-346781

(51) Int. Cl.
*H04Q 7/00* (2006.01)

(52) U.S. Cl. ...................... 370/334; 370/310

(58) Field of Classification Search ................ 370/329, 370/319, 334, 344, 349, 400, 310, 328, 339, 370/341

See application file for complete search history.

(56) References Cited

U.S. PATENT DOCUMENTS 5,073,971 A * 12/1991 Schaeffer ................... 455/447
5,365,571 A * 11/1994 Rha et al. ................... 455/446
5,483,667 A * 1/1996 Faruque ...................... 455/447
7,174,170 B2 * 2/2007 Steer et al. .................. 455/446
2004/0156345 A1* 8/2004 Steer et al. .................. 370/338
2005/0075104 A1* 4/2005 Jain et al. .................... 455/423

FOREIGN PATENT DOCUMENTS

| JP | 10-290229 A | 10/1998 |
| JP | 11-112412 | 4/1999 |
| JP | 2002-345016 | 11/2002 |
| JP | 2004-080130 | 11/2004 |

* cited by examiner

*Primary Examiner*—Brenda Pham
(74) *Attorney, Agent, or Firm*—Venable LLP; Michael A. Sartori; Yao Wang

(57) ABSTRACT

A multi-hop wireless communication system operates on multiple channels. Each wireless station in the system has at least two transmitting and receiving modules operating on different fixed channels. During transmission and reception of the packets, the transmitting and receiving modules are used selectively on each hop, using a channel supported by the wireless stations at both ends of the hop. When two or more channels are available, the channel used is selected so as to balance channel usage in the system as a whole, or on the multi-hop path as a whole. Alternatively, each wireless station may have a fixed transmitting channel. Communication delays are reduced because channel switching overhead is eliminated.

12 Claims, 17 Drawing Sheets

FIG. 4

| PATH \ HOP | 1st | | 2nd | | 3rd | | 4th | |
|---|---|---|---|---|---|---|---|---|
| BS03⇒BS20 | BS03 ⇒ BS02 | ch1 | BS02 ⇒ BS08 | ch2 | BS08 ⇒ BS14 | ch1 | BS14 ⇒ BS20 | ch2 |
| | | ch2 | | ch1 | | ch2 | | ch1 |
| | BS03 ⇒ BS09 | ch1 | BS09 ⇒ BS08 | ch2 | | | | |
| | | | | ch1 | | | | |
| | | ch2 | BS09 ⇒ BS15 | ch2 | BS15 ⇒ BS14 | ch1 | | |
| | | | | | | ch2 | | |
| | | | | ch1 | BS15 ⇒ BS21 | ch1 | BS21 ⇒ BS20 | ch2 |
| | | | | | | ch2 | | ch1 |

FIG. 5

| PATH \ HOP | 1st | 2nd | | 3rd | | 4th | |
|---|---|---|---|---|---|---|---|
| BS03⇒BS20 | BS03 ⇒ BS11 / ch1 | BS11 ⇒ BS10 | ch2 | BS10 ⇒ BS19 | ch1 | BS19 ⇒ BS20 | ch2 |
| | | | ch1 | | ch2 | | ch1 |
| | BS03 ⇒ BS11 / ch2 | BS11 ⇒ BS12 | ch2 | BS12 ⇒ BS21 | ch1 | BS21 ⇒ BS20 | ch2 |
| | | | ch1 | | ch2 | | ch1 |

FIG. 13

| PATH \ HOP | 1st | | 2nd | | 3rd | | 4th | |
|---|---|---|---|---|---|---|---|---|
| BS03⇒BS20 | BS03⇒BS02 | ch2 | BS02⇒BS08 | ch2 | BS08⇒BS14 | ch2 | BS14⇒BS20 | ch4 |
| | | | BS09⇒BS08 | ch4 | | ch4 | | |
| | BS03⇒BS09 | ch2 | | ch2 | | | | |
| | | ch4 | BS09⇒BS15 | ch4 | BS15⇒BS14 | ch4 | | |
| | | | | | BS15⇒BS21 | ch4 | BS21⇒BS20 | ch4 |
| | | | | | | ch3 | | ch3 |

FIG. 14

| PATH \ HOP | 1st | | 2nd | | 3rd | | 4th | |
|---|---|---|---|---|---|---|---|---|
| BS03⇒BS20 | BS03 ⇒ BS11 | ch3 | BS11 ⇒ BS10 | ch4 | BS10 ⇒ BS19 | ch4 | BS19 ⇒ BS20 | ch4 |
| | | ch4 | BS11 ⇒ BS12 | ch4 | BS12 ⇒ BS21 | ch4 | BS21 ⇒ BS20 | ch4 |

FIG. 15

| PATH \ HOP | 1st | 2nd | | 3rd | | 4th | |
|---|---|---|---|---|---|---|---|
| BS03⇒BS20 | BS03 ⇒ BS11 ch4 | BS11 ⇒ BS10 | ch2 | BS10 ⇒ BS19 | ch4 | BS19 ⇒ BS20 | ch2 |
| | | | ch4 | | ch2 | | |
| | BS03 ⇒ BS11 ch2 | BS11 ⇒ BS12 | ch2 | BS12 ⇒ BS21 | ch2 | BS21 ⇒ BS20 | ch1 |
| | | | | | ch1 | | ch2 |

FIG. 16

| PATH \ HOP | 1st | | 2nd | | 3rd | | 4th | |
|---|---|---|---|---|---|---|---|---|
| BS03⇒BS20 | BS03 ⇒ BS11 | ch2 | BS11 ⇒ BS19 | ch2 | BS10 ⇒ BS19 | ch2 | BS19 ⇒ BS20 | ch2 |
| | | | | | | | | ch4 |
| | | | BS11 ⇒ BS12 | ch2 | BS12 ⇒ BS21 | ch4 | BS21 ⇒ BS20 | ch4 |
| | | | | ch4 | | | | |

FIG. 17

| PATH \ HOP | 1st | | 2nd | | 3rd | | 4th | |
|---|---|---|---|---|---|---|---|---|
| BS03⇒BS20 | BS03 ⇒ BS11 | ch2 | BS11 ⇒ BS10 | ch2 | BS10 ⇒ BS19 | ch3 | BS19 ⇒ BS20 | ch2 |
| | | | | ch3 | | ch2 | | ch3 |
| | | | BS11 ⇒ BS12 | ch2 | BS12 ⇒ BS21 | ch3 | BS21 ⇒ BS20 | ch2 |
| | | | | ch3 | | ch2 | | ch3 |

MULTI-HOP MULTI-CHANNEL WIRELESS COMMUNICATION SYSTEM

BACKGROUND OF THE INVENTION

1. Field of the Invention

The present invention relates to a multi-hop wireless communication system comprising a plurality of wireless stations.

2. Description of the Related Art

Multi-hop communication networks, in which packets are relayed from one station to another in a series of hops, are a technology that is currently gaining attention because it enables wireless stations to communicate without being within receiving range of each other's signals.

The medium access control (MAC) protocol described in Standard 802.11 of the Institute of Electrical and Electronics Engineers (IEEE) provides one method, known as Carrier Sense Multiple Access with Collision Avoidance (CSMA/CA), of avoiding signal collisions in a wireless multi-hop communication network. This method, however, involves overhead that leads to communication delays, and employs a random back-off technique that leads to variations in delay time. These considerations limit the number of real-time connections (e.g., telephone calls) that the network can support simultaneously, as well as lowering throughput and quality of service (QoS).

A known way to reduce network delays and increase network throughput is to use multiple communication channels. Spreading the collision avoidance overhead over multiple channels can reduce the overhead in each channel to a level such that quality of service is not significantly impaired. In a proposed method of using multiple channels described in Japanese Patent Application Publication No. H10-290229, each wireless station has a wireless channel filtering section that enables a single transmitting and receiving module to support multiple simultaneously on-going connections on different channels by switching channels dynamically.

Besides requiring the additional wireless channel filtering section, however, this dynamic channel switching method generates switching overhead that also reduces throughput, increases communication delays, and limits the quality and quantity of service.

SUMMARY OF THE INVENTION

An object of the present invention is to provide a wireless communication system that assures low delay, low variation in delay, high throughput, and high quality of service in transmitting packets in a multi-hop communication network.

The invented multi-hop wireless communication system has a plurality of wireless stations that communicate by transmitting and receiving packets on a plurality of channels. Each wireless station has a plurality of transmitting and receiving modules operating on different fixed channels. During transmission and reception of packets, the transmitting and receiving modules are used selectively, using a channel supported by both the transmitting and receiving wireless stations. When two or more such channels are available, the channel used is preferably selected so as to balance channel usage in the system as a whole, or on the multi-hop path as a whole.

The invented multi-hop wireless communication system assures low delay by eliminating the overhead needed to switch the operation of a transmitting and receiving module from one channel to another. Low variation in delay, high throughput, and high quality of service are assured for the same reason.

BRIEF DESCRIPTION OF THE DRAWINGS

In the attached drawings:

FIG. 4 indicates links and channels usable on a particular path in FIG. 2;

FIG. 5 indicates links and channels usable on a particular path in FIG. 3;

FIG. 13 indicates links and channels usable on a particular path in FIG. 6;

FIG. 14 indicates links and channels usable on a particular path in FIG. 7;

FIG. 15 indicates links and channels usable on a particular path in FIG. 8;

FIG. 16 indicates links and channels usable on a particular path in FIG. 9; and FIG. 17 indicates links and channels usable on a particular path in FIG. 11.

DETAILED DESCRIPTION OF THE INVENTION

Figure 1:
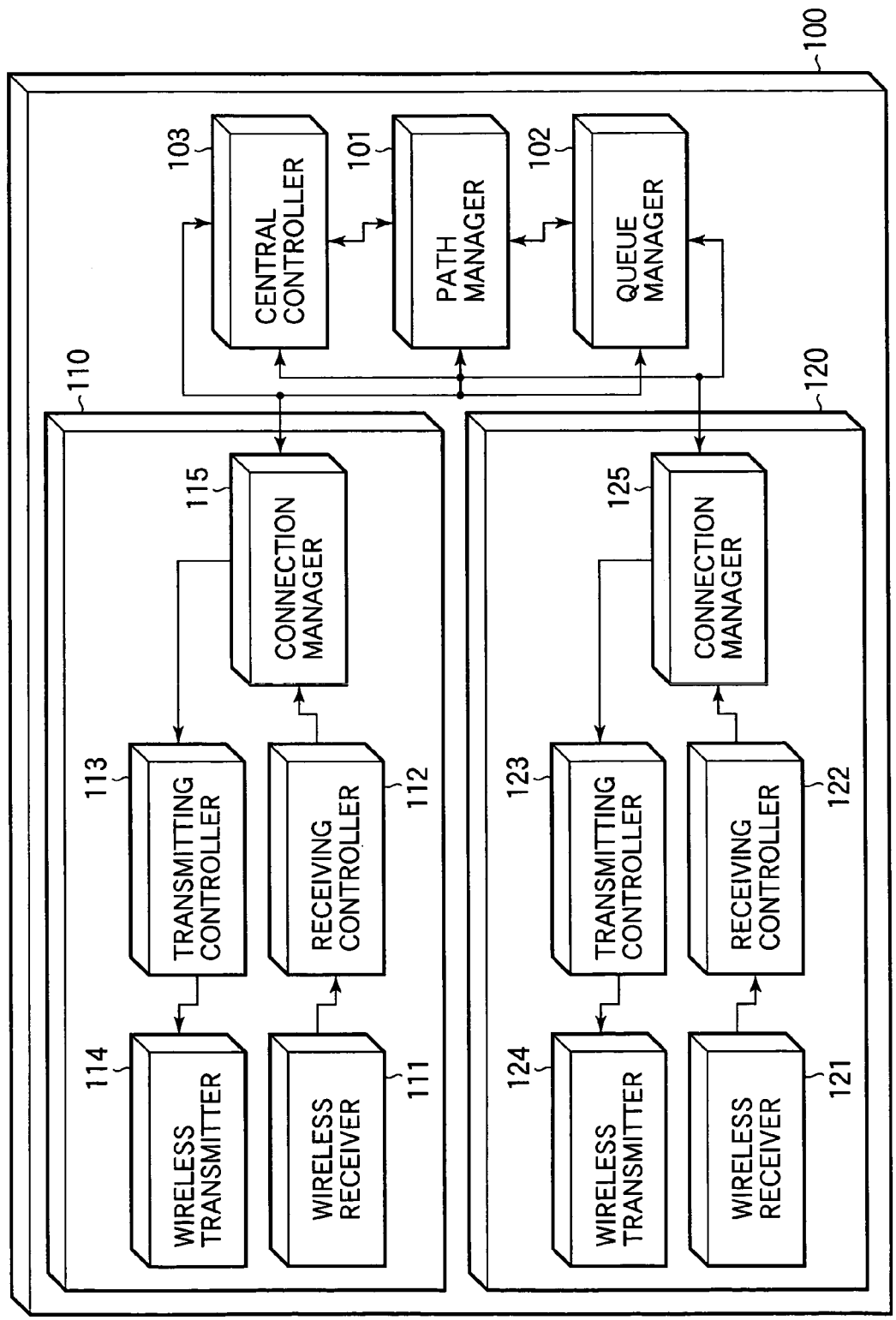
FIG. 1 is a block diagram showing the structure of a wireless station used in first and second embodiments of the invention.

Embodiments of the invention will now be described with reference to the attached drawings, in which like elements are indicated by like reference characters.

First Embodiment

Referring to FIG. 1, a wireless station in a first embodiment of the invention comprises a path manager 101, a queue manager 102, a central controller 103, and a plurality (two, in the example shown) of transmitting and receiving modules 110, 120. In contrast, a conventional wireless station (not shown) of the type noted earlier has only a single transmitting and receiving module. The transmitting and receiving modules 110, 120 have similar structures, comprising respective wireless receivers 111, 121, receiving controllers 112, 122, transmitting controllers 113, 123, wireless transmitters 114, 124, and connection managers 115, 125.

The wireless transmitters 114, 124 transmit wireless signals. The wireless receivers 111, 121 receive wireless signals. The method by which wireless signals are transmitted is not restricted to any particular method.

The receiving controllers 112 and 122 extract packets from the received wireless signal and read management information in the packets. When a packet is destined to the wireless station to which the receiving controller 112 or 122 belongs, the receiving controller 112 or 122 transfers the packet through the connection manager 115 or 125 to the central controller 103. When a packet is to be relayed to another wireless station, the receiving controller 112 or 122 transfers the packet through the connection manager 115 or 125 directly to the transmitting controller 113 or 123, or to the queue manager 102.

The transmitting controllers 113 and 123 generate and update certain parts of the management information in the packets, such as destination information or hop-count information, and generate a wireless signal from the resulting packets. A packet to be transmitted may originate at the wireless station itself and be supplied to the transmitting controller directly from the central controller 103, or from a queue in the queue manager 102 in which the packet has been placed by the central controller 103. Alternatively, the packet may have originated at another wireless station, been received by the receiving controller 112 or 122, and been placed in a queue in the queue manager 102 by the connection manager 115 or 125 or, if there is no queue, been transferred directly to the transmitting controller 113 or 123 from the connection manager 115 or 125.

The connection managers 115 and 125 perform wireless media access control, such as CSMA/CA control.

The path manager 101, which is shared by the transmitting and receiving modules 110 and 120, manages packet destination information based on packet addresses, and informs the transmitting and receiving modules of the access destination of each transmitted packet, that is, the destination of the packet on the next hop of its path.

The queue manager 102, which is shared by the transmitting and receiving modules 110 and 120, stores and manages transmitted and received packets in queues.

The central controller 103, which is shared by the transmitting and receiving modules 110 and 120, controls the above sections in cooperation with information processing apparatus (not shown) associated with the wireless station 100.

In this first embodiment, two channels (ch1 and ch2) are available to the wireless communication system as a whole. In each wireless station 100, the first channel (ch1) is fixedly assigned to transmitting and receiving module 110, and the second channel (ch2) is fixedly assigned to transmitting and receiving module 120. Therefore, the wireless station 100 is capable of transmitting and receiving packets on either channel.

The channels may be differentiated by having different carrier frequencies, or by other differing characteristics. For example, different channels may use different modulation schemes, in which case the modulation operation performed by wireless transmitter 114 differs from the modulation operation performed by wireless transmitter 124, and the demodulation operation performed by wireless receiver 111 differs from the demodulation operation performed by wireless receiver 121.

The wireless station 100 may assign one channel for transmission and another channel for reception for each communication session. Channel assignment methods will be described later. Alternatively, the wireless station 100 may transmit packets on one permanently fixed channel (ch1 or ch2), and receive packets on another permanently fixed channel (ch2 or ch1).

Figure 2:
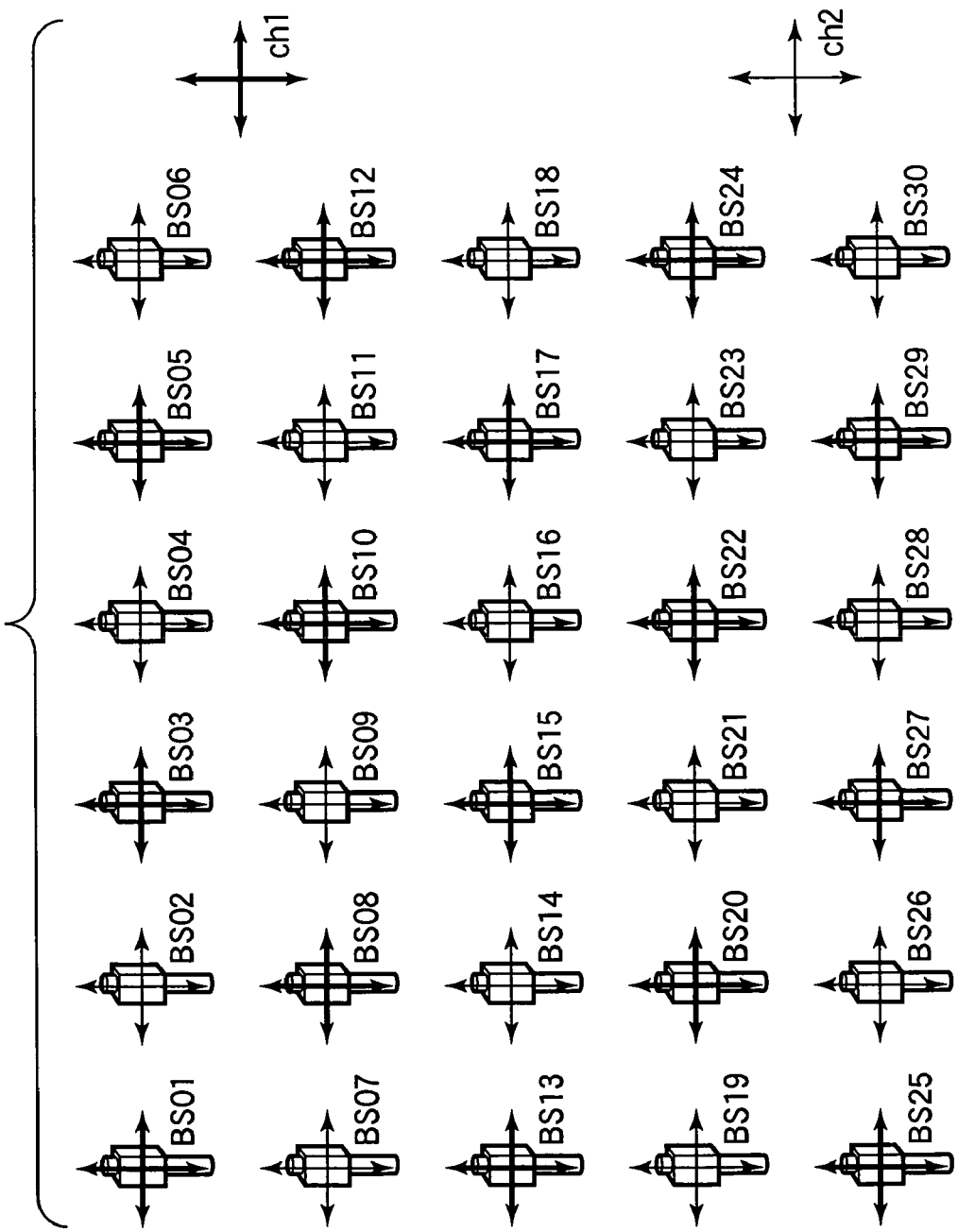
FIGS. 2 and 3 show exemplary network geometries and exemplary transmitting channel assignments in wireless communication systems according to the first embodiment.

FIG. 2 shows an exemplary wireless communication system in which fixed channels for transmitting and receiving are individually preassigned to a plurality of wireless stations 100 of the type shown in the FIG. 1. The wireless stations or base stations 100 (BS01 to BS30) are disposed at the nodes of a rectilinear lattice. Each wireless station is within single-hop communication range of its four rectilinearly adjacent neighbors, but is not within single-hop communication range of with its diagonally adjacent neighbors. Each wireless station can communicate directly with at least two and at most four other wireless stations in the network.

Diagonally adjacent wireless stations are assigned the same transmitting channel (ch1 or ch2, as indicated by thick and thin arrows in the drawing), while rectilinearly adjacent wireless stations are assigned different transmitting channels. Channels ch1 and ch2 are assigned alternately in a checkerboard pattern, so that any two mutually adjacent wireless stations transmit on different channels.

Wireless stations BS01, BS03, BS05, BS08, BS10, BS12, BS13, BS15, BS17, BS20, BS22, BS24, BS25, BS27 and BS29 use channel ch1 for transmission and channel ch2 for reception. In these wireless stations, the first transmitting and receiving module 110 transmits data packets, and the second transmitting and receiving module 120 receives data packets. Wireless stations BS02, BS04, BS06, BS07, BS09, BS11, BS14, BS16, BS18, BS19, BS21, BS23, BS26, BS28 and BS30 use channel ch2 for transmission and channel ch1 for reception. In these wireless stations, the second transmitting and receiving module 120 transmits data packets, and the first transmitting and receiving module 110 receives data packets. This arrangement enables each wireless station to transmit and receive simultaneously.

Figure 3:
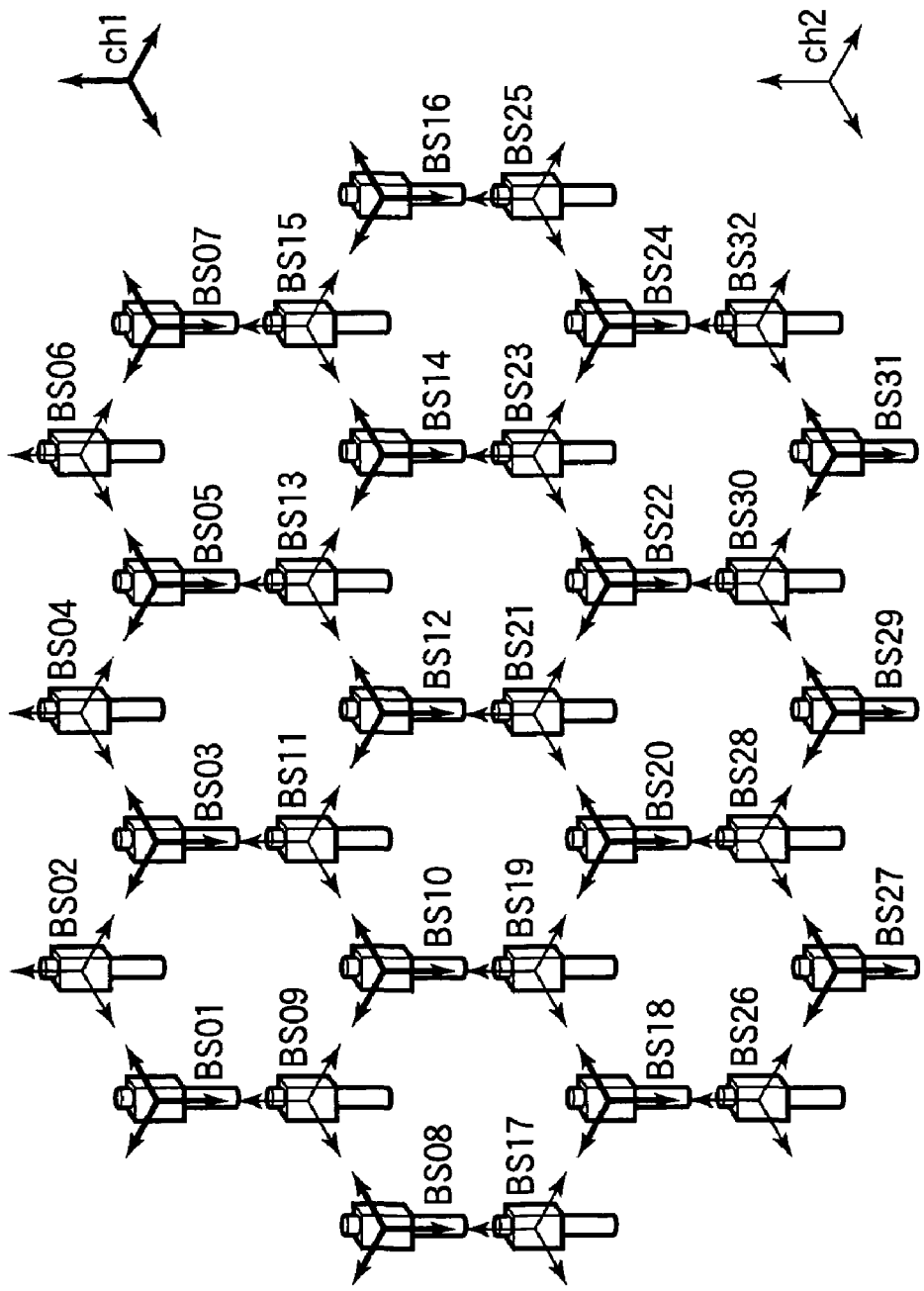

FIG. 3 shows a second exemplary wireless communication system, in which the wireless stations 100 all have the same fixed channel assignments. The wireless stations 100 (BS01 to BS32) are now disposed at the nodes of a hexagonal lattice, each wireless station being within communication range of two or three other wireless stations. Each station from BS01 to BS32 has a fixed channel (ch1 or ch2) assigned for transmitting data packets, and a fixed channel (ch2 or ch1) assigned for receiving data packets from other stations. The transmitting channel assignments are again indicated by thick and thin arrows. Channels ch1 and ch2 are assigned alternately around each hexagon in the lattice, so that any two mutually adjacent wireless stations transmit on different channels.

In the example in FIG. 3, wireless stations BS01, BS03, BS05, BS07, BS08, BS10, BS12, BS14, BS16, BS18, BS20, BS22, BS24, BS27, BS29 and BS31 use channel ch1 for transmission and channel ch2 for reception. In these wireless stations, the first transmitting and receiving module 110 transmits data packets, and the second transmitting and receiving module 120 receives data packets. Wireless stations BS02, BS04, BS06, BS09, BS11, BS13, BS15, BS17, BS19, BS21, BS23, BS25, BS26, BS28, BS30 and BS32 use channel ch2 for transmission and channel ch1 for reception. In these wireless stations, the second transmitting and receiving module 120 transmits data packets, and the first transmitting and receiving module 110 receives data packets.

Next, an example in which the transmitting and receiving channels are not permanently assigned will be described. The wireless stations 100 are arranged in a rectilinear lattice as in FIG. 2, but without the preassigned transmitting channels indicated by the thick and thin arrows. In this example, a multi-hop connection will be set up from wireless station BS03 (the source) to wireless station BS20 (the destination). FIG. 4 shows the links and channels available. First the communication path and the channel used on each hop or link (these terms will be used interchangeably below) of the path must be selected. The path manager 101 at each wireless station manages the relevant routing information, including the information about the available links and channels. After the selections have been made, communication is carried out on the selected path, using the selected channels.

The path selection is based on, for example, a cost calculated for each link. The cost may be calculated in the link set-up process before communication begins. The cost may be calculated in various known ways, typically reflecting factors such as the processing capabilities and current level of activity of each node on the path. The path selection may be made by the central controller 103 of the source wireless station, using the routing information supplied by its path manager 101. Alternatively, the source wireless station (or its central controller 103) may determine the path to the next relay wireless station, that relay wireless station (or its central controller 103) may determine the path to the next relay wireless station, and so on.

Next, the channels to be used are selected, each wireless station selecting one of the two available channels for its transmitting link. This selection may be made once, at the beginning of a communication session, following selection of the path, or repeatedly, each time a packet is transmitted from one wireless station to the next. Once again a cost calculation is performed. A cost variable is maintained for each channel, and the channel currently having the lower cost is selected.

In the MAC protocol rules governing the CSMA/CA backoff algorithm and arbitration inter-frame space (AIFS) parameter, when frequent sensing of the carrier signal occurs, the waiting time is extended. Similarly, in this embodiment, when the carrier is frequently sensed on a particular channel, the value of the cost variable of the channel is increased. Since the lower-cost channel is selected, this rule evens out the usage of the two channels and reduces congestion.

When channels are selected at the beginning of the session, following selection of the path, if a particular channel is assigned a plurality of times on same path, before channel costs are compared, an interim value is added to the cost variable of each channel according to the frequency of assignment of the channel.

For example, assume the following conditions in FIG. 4: the path from wireless station BS03 to wireless station BS20 is assigned when the cost of channel ch1 is ten (10) and the cost of channel ch2 is fifteen (15); the interim added value is three (3) per assignment; the first hop of the path is from BS03 to BS09, the second hop is from BS09 to BS08, the third hop is from BS08 to BS14, and the fourth hop is from BS14 to BS20.

In this case, channel ch1 is selected for the first hop because its cost is lower than the cost of channel ch2. Since channel ch1 has been selected for the first hop, its cost variable is updated to thirteen (13), while the cost of channel ch2 remains at fifteen (15). Therefore, channel ch1 is selected again for the second hop. The cost variable of channel ch1 is now updated to sixteen (16), while the cost of channel ch2 remains at fifteen (15). Channel ch2 is therefore selected for the third hop. The cost variable of channel ch2 is now updated to eighteen (18), while the cost of channel ch1 remains sixteen (16). Channel ch1 is therefore selected for the fourth hop. This selection scheme balances channel usage on the selected path, subject to the initial channel costs.

If the channel to be used is selected when each packet is transmitted from one wireless station to next wireless station on the path, the dynamically changing variables representing the costs of channels ch1 and ch2 may be obtained through the carrier sensing processed and may be compared without further alteration to select the channel to be used. This selection scheme can be used to balance channel usage over the system as a whole.

FIG. 5 shows the links and channels available on paths from wireless station BS03 to wireless station BS20 in the exemplary arrangement of wireless stations shown in FIG. 3 when the transmitting and receiving channels are not preassigned. The cost-variable procedure described above can again be used for path and channel selection.

The cost-variable selection procedure can also be used to select a path when the channels used for transmission and reception are permanently assigned at each wireless station. In this case, once the path has been selected, communication can begin immediately, without the need to select the channel to be used on each link. The path manager 101 then only needs to store the path information shown in FIG. 4 or FIG. 5; it is not necessary to store the fixed channel assignments.

According to the first embodiment, multi-hop wireless communication can be carried out without dynamic channel switching of the assigned channel, by providing a pair of transmitting and receiving modules in each wireless station, thus eliminating the need for redesign of the internal hardware of the modules, and eliminating the need for a dynamically switchable filtering section, which itself must be redesigned according to the network geometry of the wireless stations.

Also eliminated is the overhead for dynamic channel switching, because each wireless transmitting and receiving module transmits on only one channel at a time. Elimination of the channel switching overhead can reduce communication delays and lead to higher throughput than in the prior art described above.

Another effect of this embodiment is that it permits a particularly simple control scheme in which each wireless station can devote one transmitting and receiving module to data packet transmission on a fixed channel (ch1 or ch2) and devote another transmitting and receiving module to data packet reception on another fixed channel (ch2 or ch1).

Second Embodiment

Next, a second embodiment of the invented wireless communication system will be described.

Each wireless station in the second embodiment has the same internal structure as in the first embodiment, shown in FIG. 1.

The difference between the first and second embodiments is that in the second embodiment, the number of wireless channels used in the entire wireless communication system exceeds the number of transmitting and receiving modules in any one wireless station. Consequently, whereas in the first embodiment all wireless stations used the same pair of channels (ch1 and ch2), in the second embodiment different wireless stations use different pairs of channels. As in the first embodiment, the transmitting and receiving channels may be permanently assigned at each wireless station.

Figure 6:
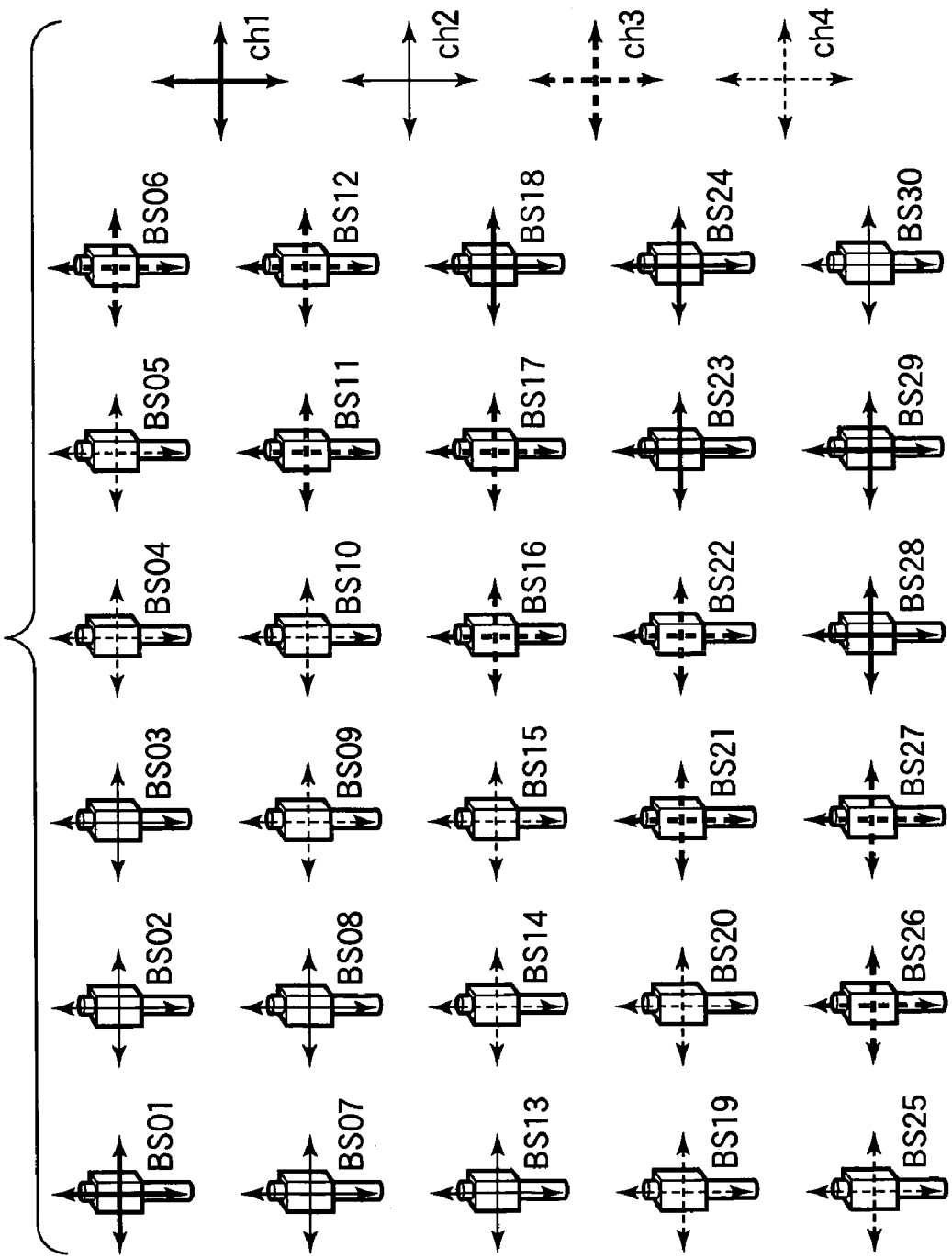
FIGS. 6 to 12 show exemplary network geometries and exemplary transmitting channel assignments in wireless communication systems according to the second embodiment.

FIGS. 6 to 12 show exemplary fixed channel assignments in the second embodiment. FIG. 6 shows a communication system in which the wireless stations are disposed at the nodes of a rectangular lattice, while FIGS. 7 to 12 show systems in which the lattice is hexagonal. In the arrangement of FIG. 6, each wireless station is within single-hop communication range of two to four other wireless stations; in the arrangement in FIGS. 7 to 12, each wireless station is within single-hop communication range of two or three other stations. The wireless communication systems in FIGS. 6 to 10 use four channels (ch1 to ch4) in all, while the systems in FIGS. 11 and 12 use only three channels (ch1 to ch3).

In all of these arrangements, one channel from among channels ch1 to ch4 or channels ch1 to ch3 is fixedly assigned to the first transmitting and receiving module 110 in each wireless station 100, and another channel in the channels ch1 to ch4 or channels ch1 to ch3 is fixedly assigned to the second transmitting and receiving module 120 in each wireless station 100.

In FIG. 6, for example, in wireless station BS03, channel ch2 is fixedly assigned to the first transmitting and receiving module 110 for transmission of packets to and reception of packets from adjacent wireless station BS02, and for transmission of packets to adjacent wireless stations BS04 and BS09. Channel ch4 is fixedly assigned to the second transmitting and receiving module 120 for reception of packets from adjacent wireless stations BS04 and BS09. In this configuration, only one channel (ch2) is available for communication between wireless stations BS03 and BS02, because channel ch2 is the only channel assigned to both stations BS03 and BS02. Both channels ch2 and ch4 can be used in communication between wireless station BS03 and wireless station BS04 or BS09.

In the wireless communication systems in FIGS. 6 to 12, every mutually adjacent pair of wireless stations have at least one assigned channel in common. Accordingly, each wireless station can communicate with all of its immediate neighbors, and any wireless station can communicate with any other wireless station in the system through a series of hops.

In the more general case, each wireless station has at least one assigned channel in common with at least one other adjacent wireless station, and the channels are assigned so that although a wireless station cannot necessarily communicate directly with all of its immediate neighbors, it can still reach any other wireless station in the system through a series of hops, so that the system forms a single communication network.

When each wireless station 100 has only two transmitting and receiving modules 110, 120, if the number of channels used in the system as a whole is greater than two, it is not possible for each wireless station to have two channels in common with all of the other wireless stations within single-hop communication range, but it is preferable for each wireless station to have two channels in common with at least one other wireless station, to enable different channel assignments to be spread evenly over the network.

In FIG. 6, for example, each wireless station has two channels in common with two of the four rectilinearly adjacent wireless stations with which it is in single-hop communication range. This is accomplished by an arrangement in which wireless stations that are adjacent in the upper-right-to-lower-left diagonal direction transmit on the same channel, while wireless stations that are adjacent in the upper-left-to-lower-right diagonal direction transmit on different channels, as indicated by the arrows.

Figure 7:
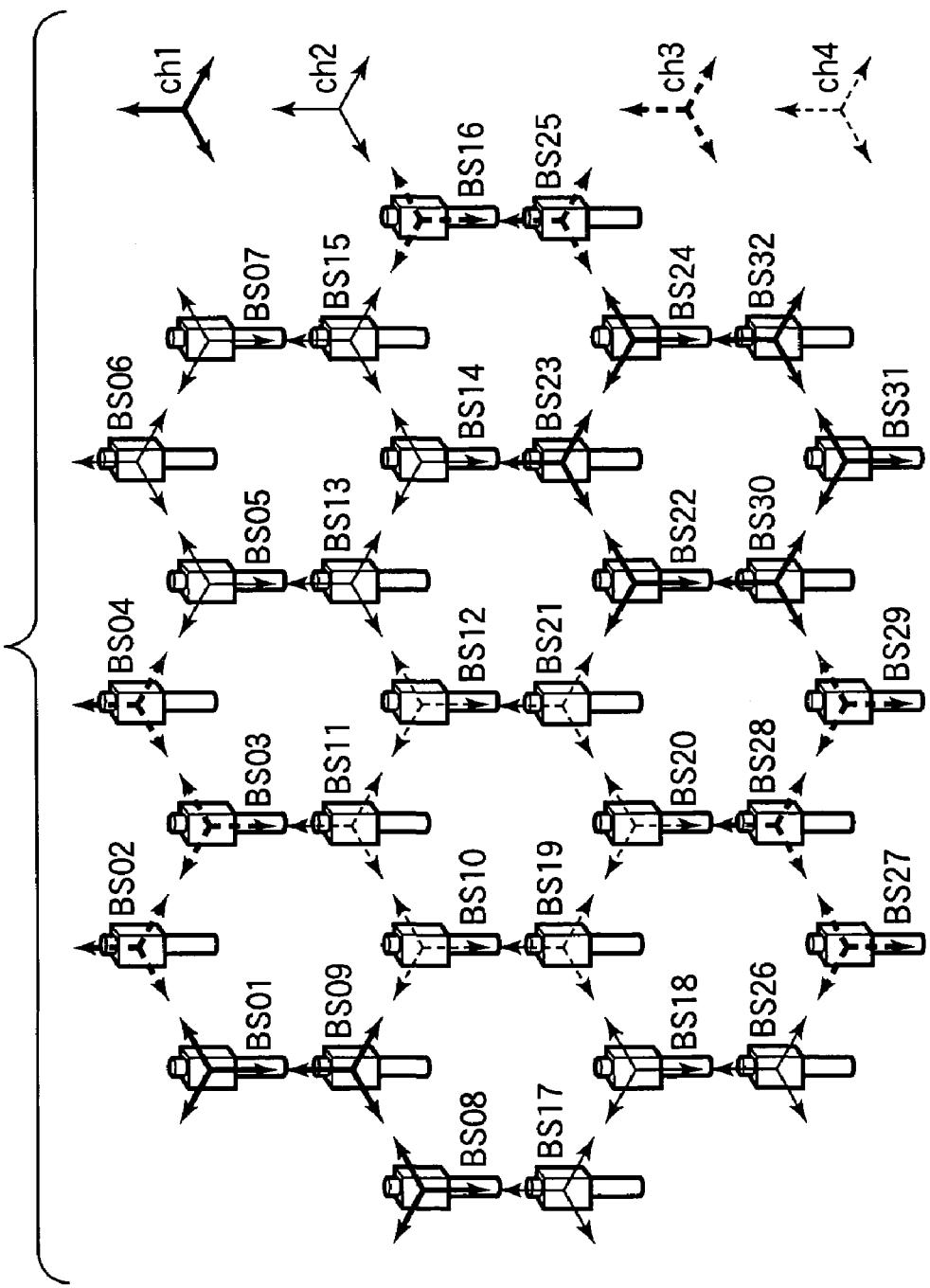
Figure 8:
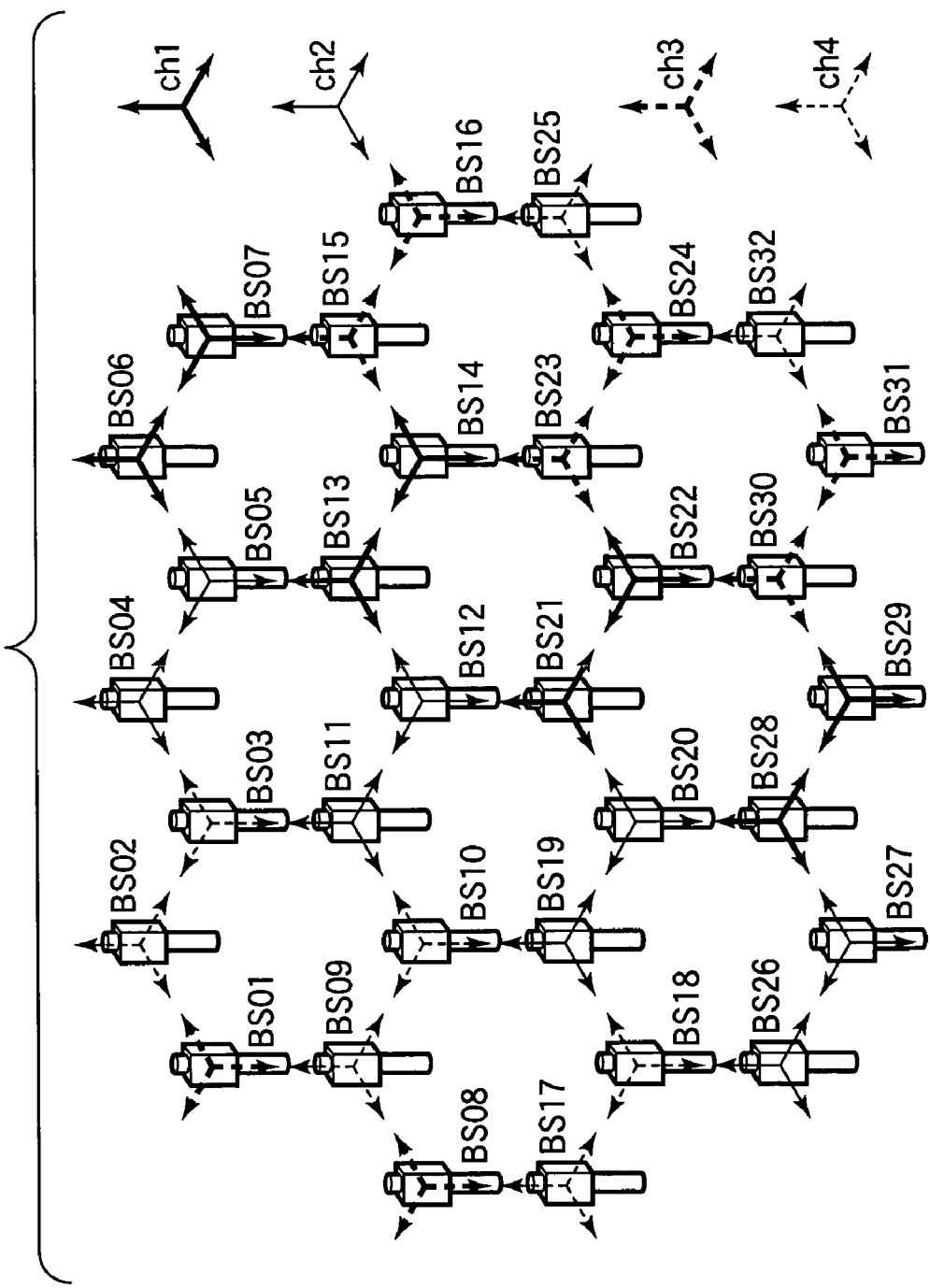
Figure 9:
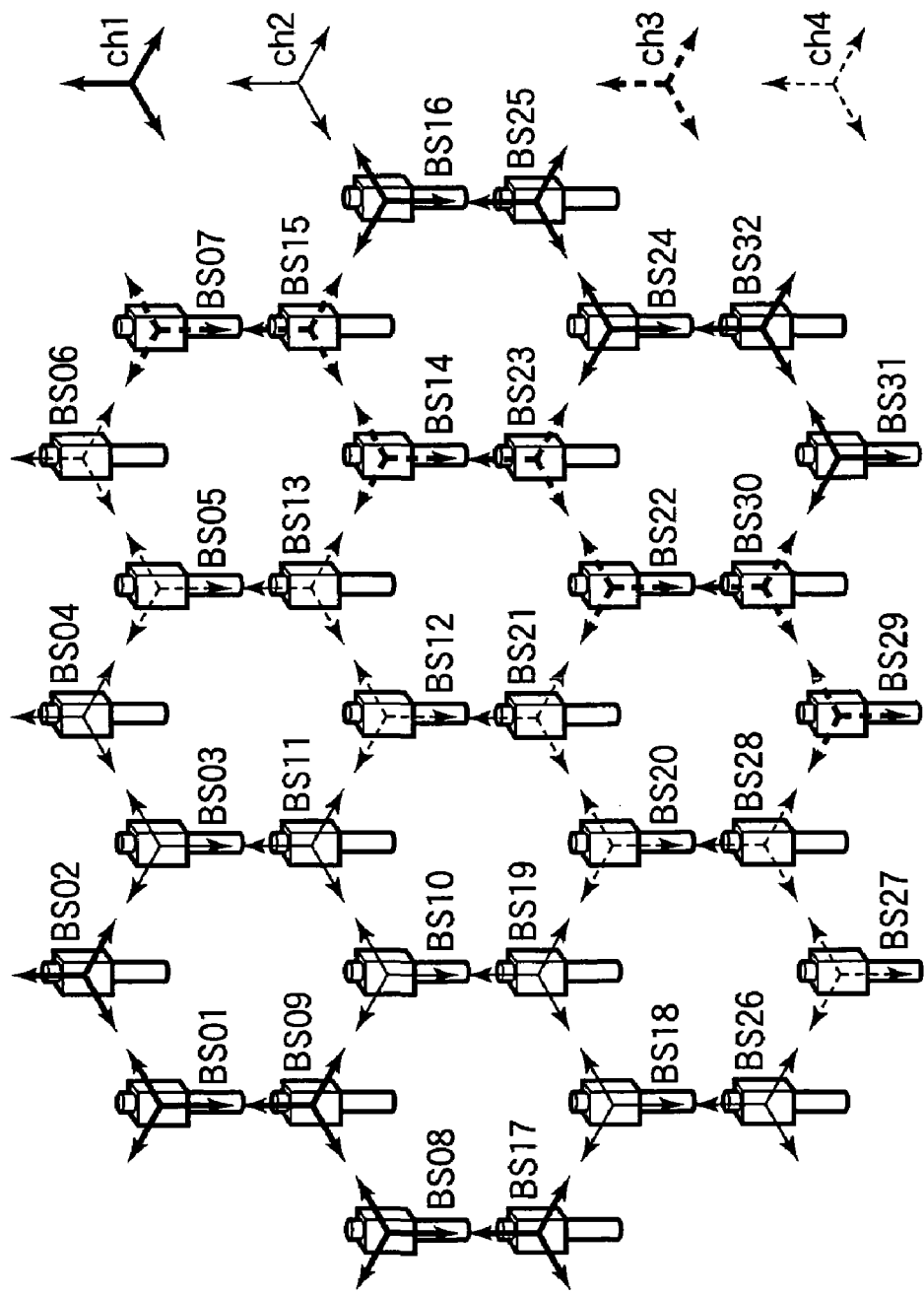
Figure 10:
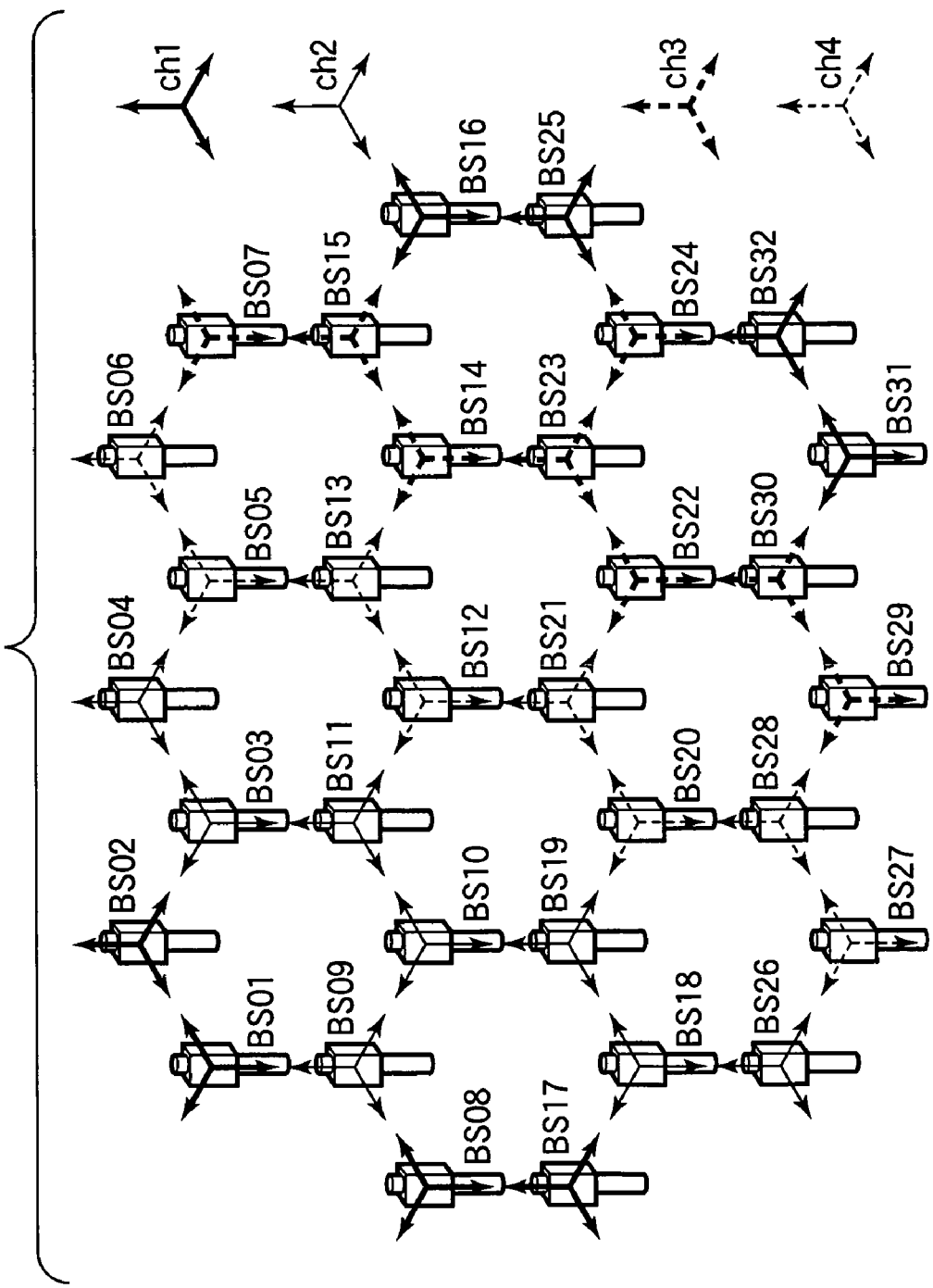
Figure 11:
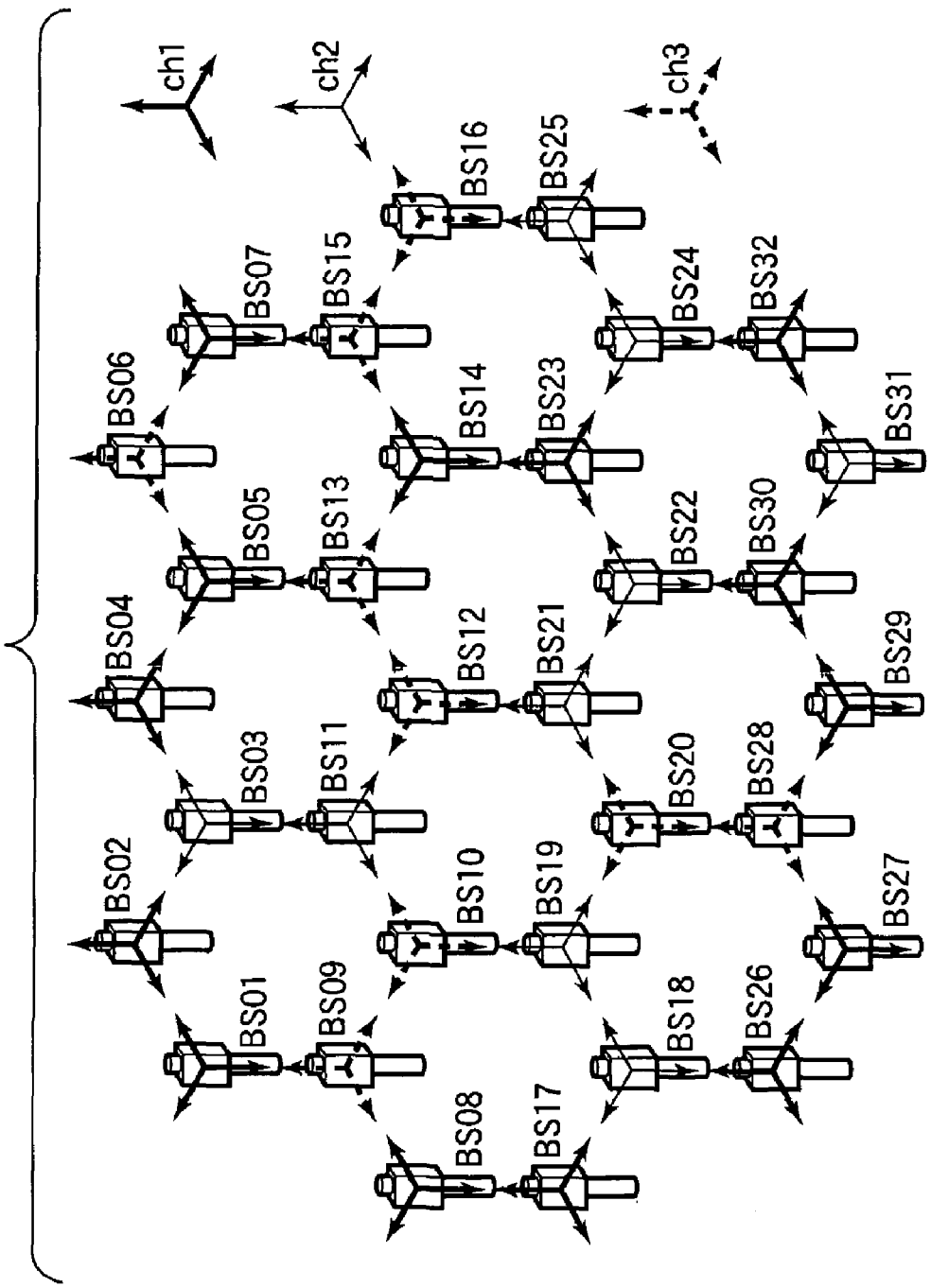
Figure 12:
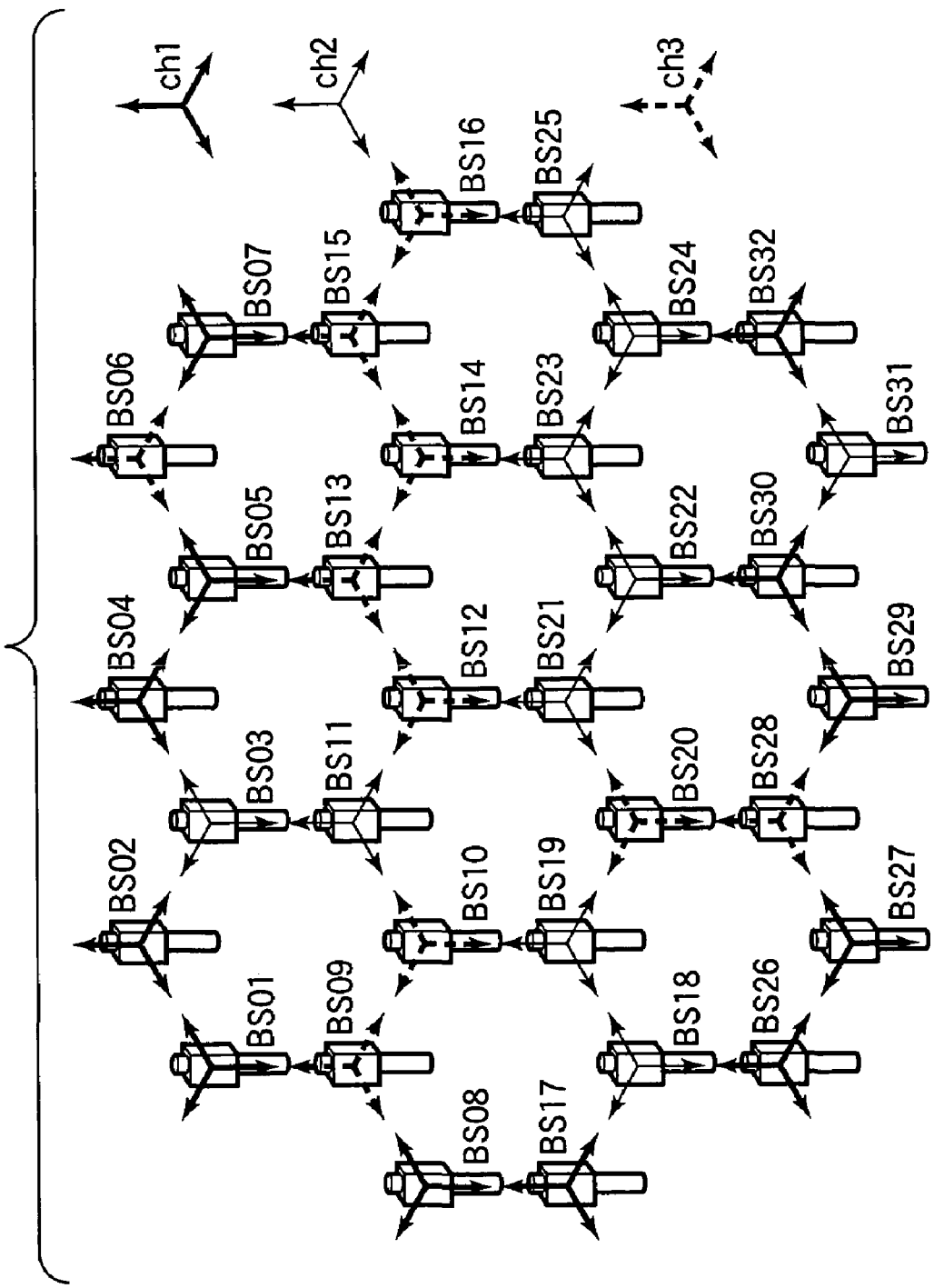

In a network in which a typical wireless station is within single-hop communication range of three other wireless stations, as in FIGS. 7 to 12, it is generally preferable for each such wireless station to have multiple channels in common with two of its three neighboring wireless stations, as in FIGS. 8 and 11, but arrangements in which each wireless station has multiple channels in common with only one of the three neighboring wireless stations, as in FIGS. 7 and 9, are also contemplated.

The hexagonal lattice in FIG. 7 includes two types of hexagonal rings of wireless stations. The six pairwise adjacent wireless stations in one type of hexagonal ring (e.g., BS10, BS11, BS12, BS21, BS20, BS19) all transmit on the same channel (e.g., ch4). The six pairwise adjacent wireless stations in the other type of hexagonal ring (e.g., BS12, BS13, BS14, BS23, BS22, BS21) include a first mutually adjacent pair of wireless stations (BS22, BS23) that both transmit on one channel (ch1), a second mutually adjacent pair of wireless stations (BS13, BS14) that both transmit on another channel (ch2), and a third mutually adjacent pair of wireless stations (BS12, BS21) that both transmit on yet another channel (ch4).

In FIG. 8, wireless stations that are mutually adjacent in the upper-left-to-lower-right diagonal direction (e.g., BS02 and BS03) both transmit on the same channel. Wireless stations that are mutually adjacent in other directions transmit on mutually differing channels.

In FIG. 9, wireless stations that are mutually adjacent in the upper-left-to-lower-right diagonal direction (e.g., BS02 and BS03) both transmit on mutually differing channels. Wireless stations that are mutually adjacent in other directions transmit on the same channel.

In FIG. 11, there are again two types of hexagonal rings. The six pairwise adjacent wireless stations constituting one type of ring (e.g., BS01, BS02, BS03, BS11, BS10, BS09) include a first mutually adjacent pair of wireless stations (BS01, BS02) that both transmit on the first channel (ch1), a second mutually adjacent pair of wireless stations (BS03, BS11) that both transmit on the second channel (ch2), and a third mutually adjacent pair of wireless stations (BS09, BS10) that both transmit on the third channel (ch3). The six pairwise adjacent wireless stations constituting the other type of hexagonal ring include three mutually non-adjacent wireless stations (e.g., BS23, BS30, BS32) transmitting on the first channel (ch1) and three more mutually non-adjacent wireless stations (e.g., BS22, BS24, BS31) transmitting on the second channel (ch2).

The channel assignments in FIGS. 9 and 11 are not tightly constrained. In FIG. 9, for example, wireless station BS09 can have its transmitting channel assignment changed from ch1 to ch2, and wireless station BS24 can have its transmitting channel assignment changed from ch3 to ch1, giving the variation shown in FIG. 10. In FIG. 11, wireless station BS14 can have its transmitting channel assignment changed from ch1 to ch3, and wireless station BS23 can have its transmitting channel assignment changed from ch1 to ch2, giving the variation shown in FIG. 12. This swapping of channel assignments enables channel usage to be balanced even when link usage is not balanced.

The selection of paths and channels in the second embodiment by use of cost variables is made as described in the first embodiment, so a repeated description will be omitted.

As in the first embodiment, the transmitting channel assignments need not be fixed. That is, although a single channel is permanently assigned to each transmitting and receiving module 110, 120, both modules may be used for transmitting. For reference, FIGS. 13 to 17 show available links and channels on paths from wireless station BS03 to wireless station BS20 for this case, based on the arrangements illustrated in FIGS. 6 to 9 and FIG. 11. FIGS. 13 to 17 are similar to FIGS. 3 and 5 in the first embodiment, so a detailed description will be omitted.

The second embodiment has effects similar to those of the first embodiment.

An additional advantage of the second embodiment is that it can further increase the connection path capacity and throughput of the network, and reduce delays, by using more channels in the network as a whole than there are transmitting and receiving modules at any one wireless station.

In both embodiments above, there are just two transmitting and receiving modules in each wireless station, but wireless stations with three or more transmitting and receiving modules are also contemplated. Different wireless stations may have different numbers of transmitting and receiving modules. The channel assigned to each transmitting and receiving module is still fixed. The channel used by each transmitting and receiving module in a wireless station may be permanently assigned at the time of installation, from a selection of three or more channels.

The arrangement of wireless stations is not limited to the rectilinear and hexagonal lattices shown in the preceding embodiments. Other arrangements are also possible.

Those skilled in the art will recognize that further variations are possible within the scope of the invention, which is defined in the appended claims.

What is claimed is:

1. A multi-hop wireless communication system having a plurality of wireless stations that communicate by transmitting and receiving packets on a plurality of channels, wherein:
    each wireless station has a plurality of transmitting and receiving modules operating on different fixed channels among the plurality of channels;
    each wireless station uses a fixed one or more of the plurality of channels for transmitting and a different fixed one or more of the plurality of channels for receiving, wherein none of the plurality of channels is used for both transmitting and receiving by the same wireless station;
    no two wireless stations within one-hop communicable range of each other use the same one or more channels for transmitting;
    no two wireless stations within one-hop communicable range of each other use the same one or more channels for receiving;
    for each pair of wireless stations within one-hop communicable range of each other, there is a pair of channels in the plurality of channels such that one wireless station in the pair of wireless stations uses one channel in the pair of channels for transmitting and uses another channel in the pair of channels for receiving, and another wireless station in the pair of wireless stations uses the one channel in the pair of channels for receiving and uses the another channel in the pair of channels for transmitting.

2. The multi-hop wireless communication system of claim 1, wherein the channels are distinguished by use of different carrier frequencies or different carrier modulation schemes.

3. The multi-hop wireless communication system of claim 1, wherein the channels used to transmit the packets are selected according to variables that vary with channel usage.

4. The multi-hop wireless communication system of claim 3, wherein said variables comprise a cost variable for each channel in the set of at least two channels.

5. The multi-hop wireless communication system of claim 1 wherein, when a packet is transmitted over a hop from a first wireless station to a second wireless station in the wireless communication system and there is a set of at least two channels both used for transmitting at the first wireless station and for receiving at the second wireless station, the channel used to transmit the packet is selected from said set so as to balance channel usage over the wireless communication system as a whole.

6. The multi-hop wireless communication system of claim 1 wherein, when a packet is transmitted over a multi-hop path from a first wireless station to a second wireless station in the wireless communication system and there is a set of at least two channels used for transmitting at a wireless station at one end of a hop in the path and for receiving by a wireless station at another end of the hop in the path, the channel used to transmit the packet on the hop is selected from said set so as to balance channel usage over the path as a whole.

7. The multi-hop wireless communication system of claim 1, wherein the number of wireless channels used in the entire wireless communication system equals the maximum number of transmitting and receiving modules per wireless station in the wireless communication system.

8. The multi-hop wireless communication system of claim 1, wherein the wireless stations are disposed at nodes of a rectilinear lattice, each wireless station has two transmitting and receiving modules, rectilinearly adjacent wireless stations transmit on mutually differing channels, and diagonally adjacent wireless stations transmit on mutually identical channels.

9. The multi-hop wireless communication system of claim 1, wherein the wireless stations are disposed at nodes of a hexagonal lattice, each wireless station is within single-hop communicable range of at least two and at most three other wireless stations in the plurality of wireless stations, each wireless station has two transmitting and receiving modules, and each mutually adjacent pair of wireless stations transmit on mutually differing channels.

10. The multi-hop wireless communication system of claim 1, wherein: the number of wireless channels used in the entire wireless communication system is greater than the maximum number of transmitting and receiving modules per wireless station in the wireless communication system; and
    each pair of wireless stations in the wireless communication system is connectable by a multi-hop path such that the two wireless stations on each hop of the multi-hop path have a common channel, a common channel being a channel used by transmitting and receiving modules at both of the two wireless stations.

11. The multi-hop wireless communication system of claim 1, wherein the plurality of channels is divided into a first subset and a second subset, the first subset and the second subset being mutually exclusive, and on any multi-hop transmitting path in the multi-hop wireless communication system, hops on which a channel in the first subset is used for transmitting alternate with hops on which a channel in the second subset is used for transmitting.

12. The multi-hop wireless communication system of claim 1, wherein the plurality of channels consists of just two channels, which are used alternately on successive hops of all multi-hop transmitting paths in the multi-hop wireless communication system.

* * * * *

UNITED STATES PATENT AND TRADEMARK OFFICE
CERTIFICATE OF CORRECTION

PATENT NO. : 7,649,870 B2
APPLICATION NO. : 11/287444
DATED : January 19, 2010
INVENTOR(S) : Youiti Kado It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 900 days.

Signed and Sealed this

Twenty-third Day of November, 2010

David J. Kappos
*Director of the United States Patent and Trademark Office*